(12) United States Patent
Blanc et al.

(10) Patent No.: US 10,723,488 B2
(45) Date of Patent: Jul. 28, 2020

(54) DEVICE FOR RETAINING AND RELEASING APPENDAGES

(71) Applicant: THALES, Courbevoie (FR)

(72) Inventors: Alain-Vincent Blanc, Cannes la Bocca (FR); Thomas Combernoux, Cannes la Bocca (FR); François Michellet, Cannes la Bocca (FR); Damien Chassoulier, Mouans-Sartoux (FR)

(73) Assignee: THALES, Courbevoie (FR)

( * ) Notice: Subject to any disclaimer, the term of this patent is extended or adjusted under 35 U.S.C. 154(b) by 406 days.

(21) Appl. No.: 15/382,219

(22) Filed: Dec. 16, 2016

(65) Prior Publication Data

US 2017/0174366 A1 Jun. 22, 2017

(30) Foreign Application Priority Data

Dec. 18, 2015 (FR) ...................................... 15 02636

(51) Int. Cl.
*B64G 1/22* (2006.01)
*B64G 1/10* (2006.01)
*B64G 1/44* (2006.01)

(52) U.S. Cl.
CPC ............... *B64G 1/222* (2013.01); *B64G 1/10* (2013.01); *B64G 1/443* (2013.01)

(58) Field of Classification Search
CPC ........... B64G 1/222; B64G 1/443; B64G 1/10
See application file for complete search history.

(56) References Cited

U.S. PATENT DOCUMENTS

| 5,248,233 A * | 9/1993 | Webster | F16B 5/0208 |
| | | | 102/377 |
| 2005/0050841 A1 * | 3/2005 | Legrand | B64G 1/222 |
| | | | 52/749.1 |
| 2005/0084364 A1 | 4/2005 | Tuszynski | |
| 2012/0076614 A1 * | 3/2012 | Baghdasarian | B64G 1/222 |
| | | | 411/427 |

FOREIGN PATENT DOCUMENTS

EP          2 319 764 A1    5/2011

* cited by examiner

*Primary Examiner* — Valentina Xavier
(74) *Attorney, Agent, or Firm* — Baker & Hostetler LLP (57) ABSTRACT

An active tie rod for retaining and releasing appendages without shock is provided. The device comprises: a fixed base, a tie rod extending along an axis between two ends, a mechanism fastened to the base and temporarily retaining a first end of the tie rod, operating the mechanism to release the tie rod from the base, an end piece fastened to a second end of the tie rod, at least one appendage temporarily retained between the base and the end piece, a component disposed between the mechanism and the end piece, and an actuator of the component to modify a characteristic dimension of the component along the axis between two values, the component producing a tension in the tie rod for the first of the two values and the tension in the tie rod being reduced for a second of the two values.

12 Claims, 6 Drawing Sheets

DEVICE FOR RETAINING AND RELEASING APPENDAGES

CROSS-REFERENCE TO RELATED APPLICATIONS

This application claims priority to foreign French patent application No. FR 1502636, filed on Dec. 18, 2015, the disclosure of which is incorporated by reference in its entirety.

FIELD OF THE INVENTION

The present invention is particularly but not exclusively concerned with the aerospace field and to be more precise consists in an active tie rod for retaining and releasing appendages without shock, for example spacecraft appendages.

By spacecraft appendages is meant equipment intended to be deployed in space, such as solar generators or antennas for example. The invention consists in a simple and robust solution making it possible to release such appendages without shock.

BACKGROUND

An active tie rod has initially the function of retaining in a stowed configuration one or more spacecraft appendages, i.e., generally speaking, mobile elements deployable on either side of the body of the satellite, and after that releasing those appendages without shock in order to deploy them. The system for retaining the appendages in the stowed configuration and releasing them conventionally consists primarily of a separation nut and a tensioning tie rod. In concrete terms, in known devices, the tie rod participates with the nut in tensioning a series of stacked elements such as solar generators folded on one another with the aim of minimizing the volume of the satellite when it is disposed in the nose cap of a launch vehicle.

However, it is known that in this type of device the tie rod can have large geometrical defects, in particular if the number of stacked elements is large. The geometrical defects may be defects of inclination or of delocalization, for example. These geometrical defects can generate dynamic defects reflected in radial forces or moments exerted at the ends of the tie rod.

Failure to take account of these defects can generate serious malfunctions, up to non-deployment of the spacecraft appendages, and therefore possibly implying failure of the mission.

Another known problem lies in the shock that may be produced on releasing the tie rod. The aforementioned nut is responsible for releasing the tie rod. Now, at the moment of its release, the tie rod is in a stressed state and its sudden release can cause shocks that can degrade the spacecraft appendages or the satellite itself. There is a two-fold problem in the context of some present-day devices. In fact, the tie rod is initially released by a pyrotechnic latch the explosion of which generates a first shock. Thereafter, the tie rod being under tension before it is released, its sudden release, already referred to, can cause deterioration at the level of the spacecraft appendages or the supporting structure.

With the aim of minimizing this problem, so-called low shock nuts have been developed. This type of nut, which is complex, is generally of the single-use type and can be reconditioned. However the "low shock" capability of these nuts is applicable only to triggering the release of the tie rod and not the release of the appendages themselves. In fact, the geometrical defects of the tie rod are not really compensated and, in particular if the tie rod is of large size, there continues to be a sudden relaxation of the tie rod that can generate a shock that is sometimes intense, the tie rod striking the spaced appendages. This is notably explained by the fact that the release of the stressed tie rod continues to be sensitive to the angular deviations of the tie rod. The applicant has even noted that the shocks generated by the relaxation of the tie rod are most often much more severe than those generated by the nut, even if it is a pyrotechnic nut.

The patent EP 2 319 764 B1 filed 1 Oct. 2010 in the name of the applicant describes a tie rod made from a material having controlled thermal expansion. By heating the tie rod it is possible to lengthen it before releasing the nut and therefore to limit the shocks caused by the sudden relaxation of the tie rod. This solution has the disadvantage of limiting the choice of the materials from which the tie rod can be made. In fact, the required thermal expansion may be incompatible with the mechanical strength necessary to fulfil the function of retaining the appendages, notably during the launch phase in which the satellite is subjected to high levels of vibration. Moreover, the tie rod may be very long and it is necessary to heat it over its entire length to expand it. The implementation of the heater over the entire length of the tie rod is a complicated process.

SUMMARY OF THE INVENTION

The invention proposes a simple and robust solution making it possible to limit the shocks caused by the relaxation of the tie rod at the same time as making it possible to use conventional tie rods without worrying about their thermal properties.

The solution relies primarily on the dissociation of the mechanical strength properties on the one hand and thermal properties on the other hand. The invention proposes to add an additional component fulfilling only the expansion function, for example the thermal expansion function. The invention proposes a component that can be standardized, notably in order that it can be mounted anywhere in the assembly retaining the appendages before their release.

To this end, the invention consists in a device for retaining and releasing appendages, the device including:
  a fixed base,
  a tie rod extending along an axis between two ends,
  a mechanism fastened to the base and temporarily retaining a first end of the tie rod, operating the mechanism making it possible to release the tie rod from the base,
  an end piece fastened to a second end of the tie rod,
  at least one appendage temporarily retained between the base and the end piece,
  a component disposed between the mechanism and the end piece, the component being independent of the mechanism, and
  an actuator of the component making it possible to modify a characteristic dimension of the component along the axis between two values, the component producing a tension in the tie rod for the first of the two values and the tension in the tie rod being reduced for a second of the two values, the actuator being independent of the mechanism.

The independence of the component and its actuator with respect to the mechanism makes it possible to dissociate the two functions completely. In other words, actuating the component does not lead to any operation of the mechanism. Likewise, it is possible to operate the mechanism without actuating the component.

Thus the component has no predefined position between the mechanism and the end piece. This independence allows complete freedom in terms of the positioning of the component.

Moreover if the tension in the tie rod is deemed unsuitable, i.e. too high or too low, it is possible to act on the component to modify the tension in the tie rod without acting on the mechanism.

Finally, if the component or its actuator were to fail, it is nevertheless possible to release the tie rod by operating the mechanism. This is carried out in a degraded operating mode in which the tension in the tie rod is not reduced before releasing the tie rod.

The component advantageously takes the form of a washer configured to slide along the tie rod during assembly of the device.

The tie rod has a characteristic dimension perpendicularly to its axis between its two ends. The component advantageously has a hole in it with a characteristic dimension greater than the characteristic dimension of the tie rod so as to be able to slide along the tie rod during assembly of the device.

The component may be disposed at various positions in the assembly such as for example between the mechanism and the base or between the base and the at least one appendage or between the at least one appendage and the end piece. The device may include at least two appendages. The component may then be disposed between two appendages.

The component advantageously includes a material of particular thermal expansion. The actuator then includes an element making it possible to feed thermal energy to or to extract thermal energy from the component. The material is advantageously a shape memory material. The element may be a heater for raising the temperature of the material of the component.

The tension in the tie rod is advantageously zero for the second of the two characteristic dimension values of the component along the axis.

The device advantageously further includes a spring disposed between the second end of the tie rod and the at least one appendage, the spring being configured to extract the first end of the tie rod from the mechanism after the mechanism is operated.

BRIEF DESCRIPTION OF THE DRAWINGS

The invention will be better understood and other advantages will become apparent on reading the detailed description by way of example of one embodiment, which description is illustrated by the appended drawings, in which.

For clarity, the same elements bear the same references in the various figures.

DETAILED DESCRIPTION

The following description relates to a satellite and to the deployment of its appendages. It is clearly understood that the invention is not limited to the aerospace field and may be used in other fields where appendages can be deployed. These may be terrestrial antennas, underwater sensors, etc.

Figure 1A:
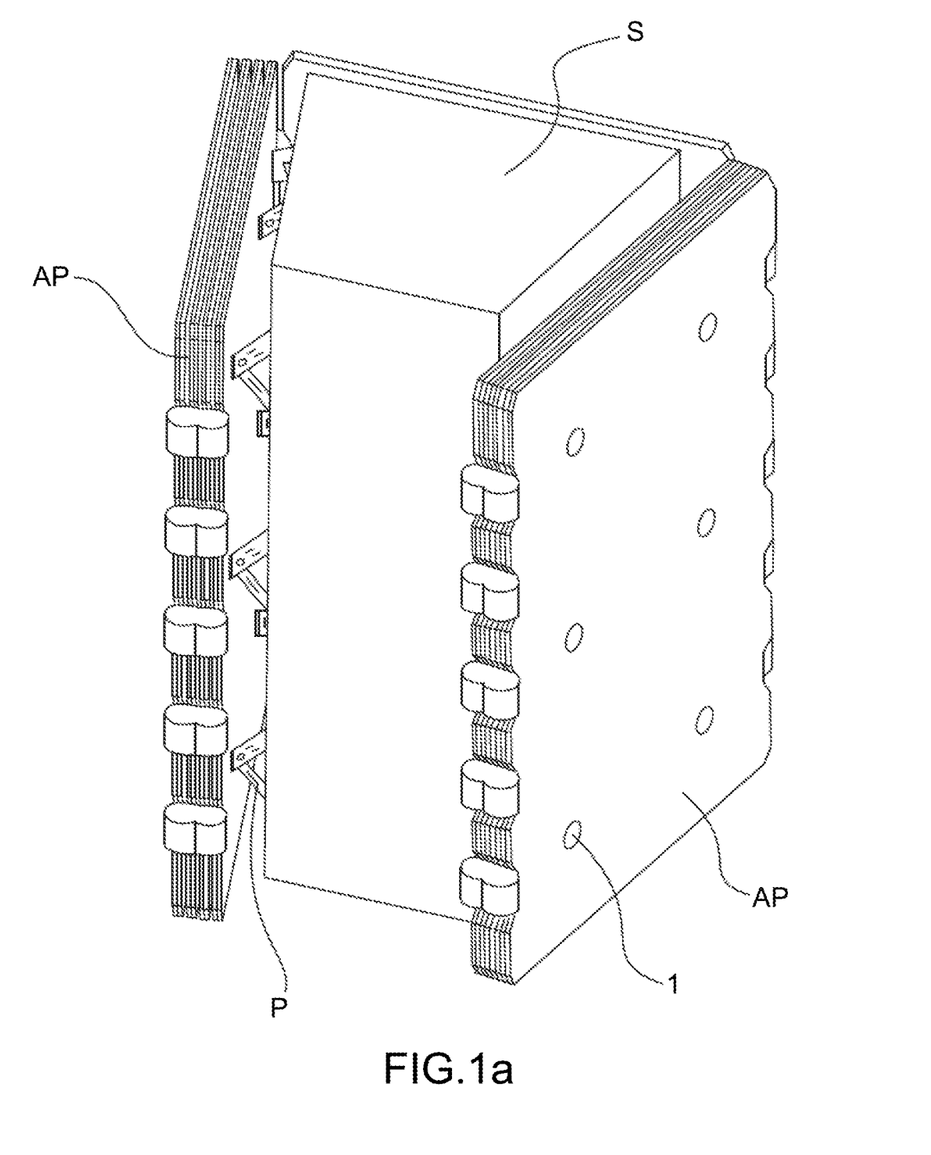
FIG. 1a represents diagrammatically a satellite including spacecraft appendages in a stowed position.
Figure 1B:
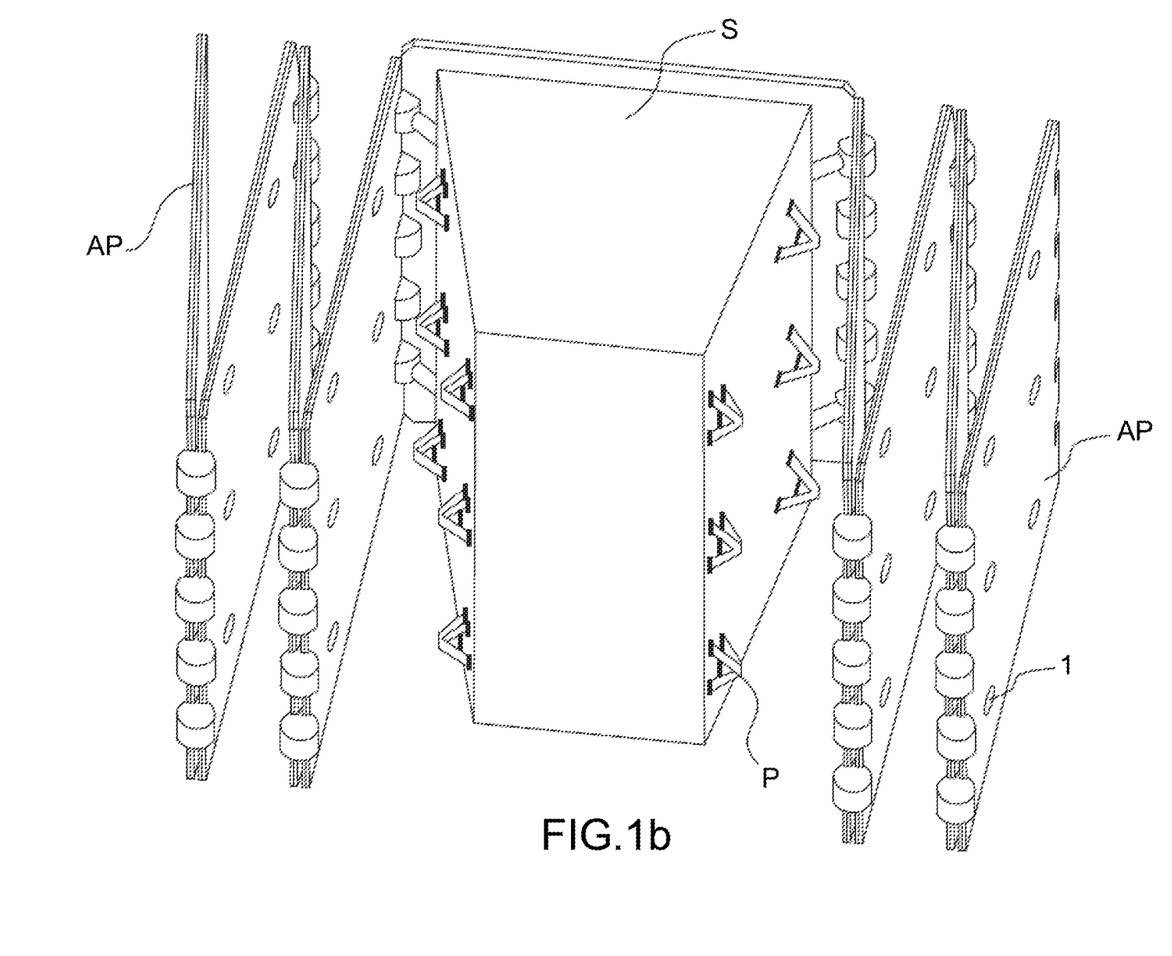
FIG. 1b represents the satellite from FIG. 1a while the spacecraft appendages are being deployed.
Figure 1C:
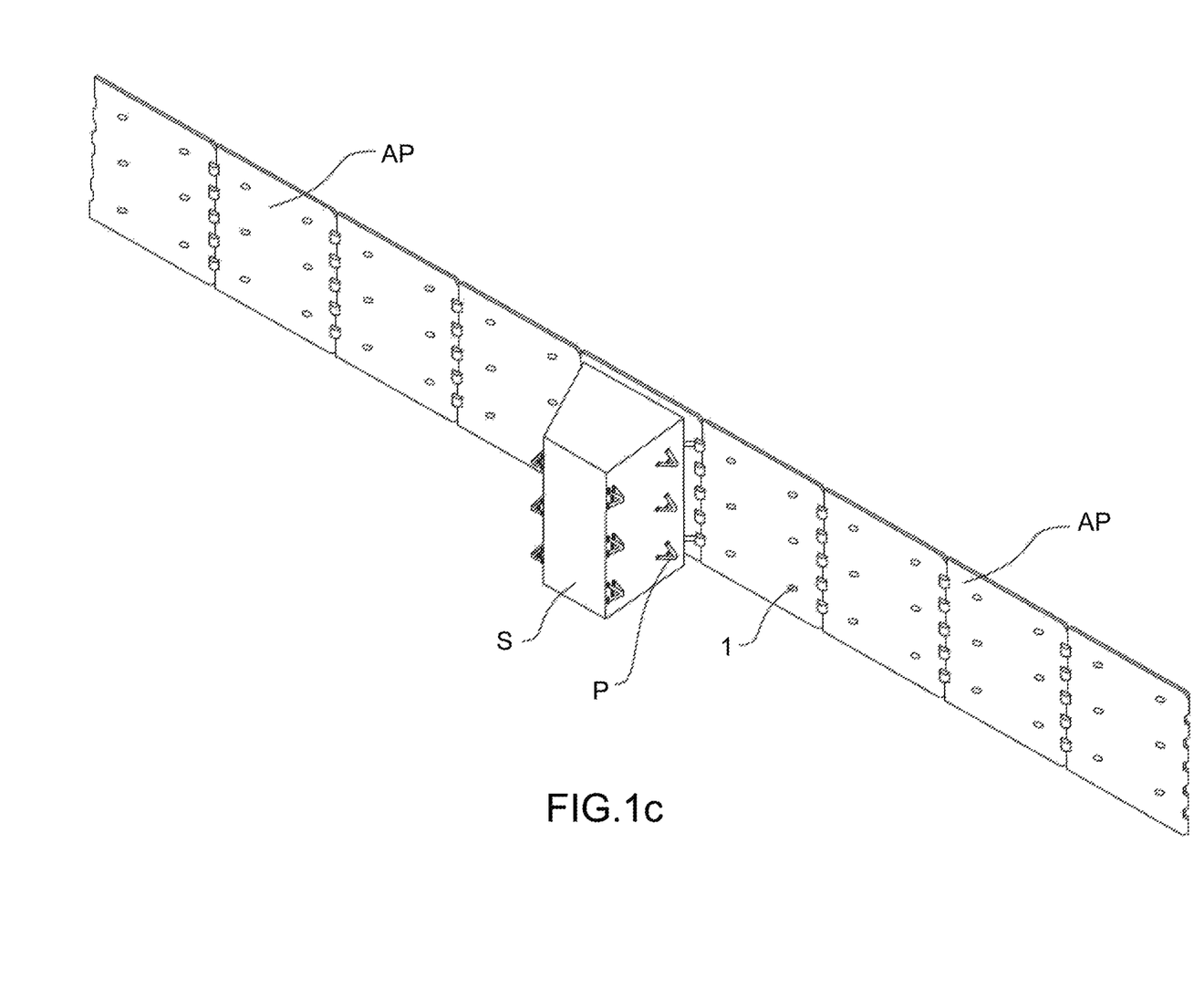
FIG. 1c represents the satellite from FIG. 1a with the spacecraft appendages in the deployed position.

The objective of FIGS. 1a, 1b, 1c is to show in a very simple manner an example of a satellite having deployable spacecraft appendages. In these three figures there is represented a satellite consisting of a body S with spacecraft appendages AP such as solar generators on respective opposite sides of the body S. In FIG. 1a, the spacecraft appendages AP are in the stowed position. Here each of the spacecraft appendages AP consists of four panels folded against one another and held in place by an appropriate device. Here that appropriate device includes tripods P on which the folded spacecraft appendages AP rest, each tripod P cooperating with a device that is not shown consisting for example of a separation nut associated with a tie rod, each tie rod passing through a bush 1 formed in and integral with each panel. As can be seen in FIGS. 1a, 1b, 1c, in this context there are six tripods P for each of the two spacecraft appendages AP, associated with six nuts and six tie rods, and six bushes per panel.

The stowed position makes it possible to integrate the satellite into the nose cone of a launch spacecraft that is to send it into orbit.

FIG. 1b represents the same satellite as FIG. 1a but the spacecraft appendages AP of which are being deployed. In fact, the appropriate means for retaining the spacecraft appendages AP in place makes it possible to release the spacecraft appendages AP at the opportune moment, and the solar panels unfold. Deployment may be driven by an electric motor or by self-motorized articulations that are not shown.

In FIG. 1c, the spacecraft appendages AP are deployed, enabling the satellite to fulfil its mission.

Figure 2A:
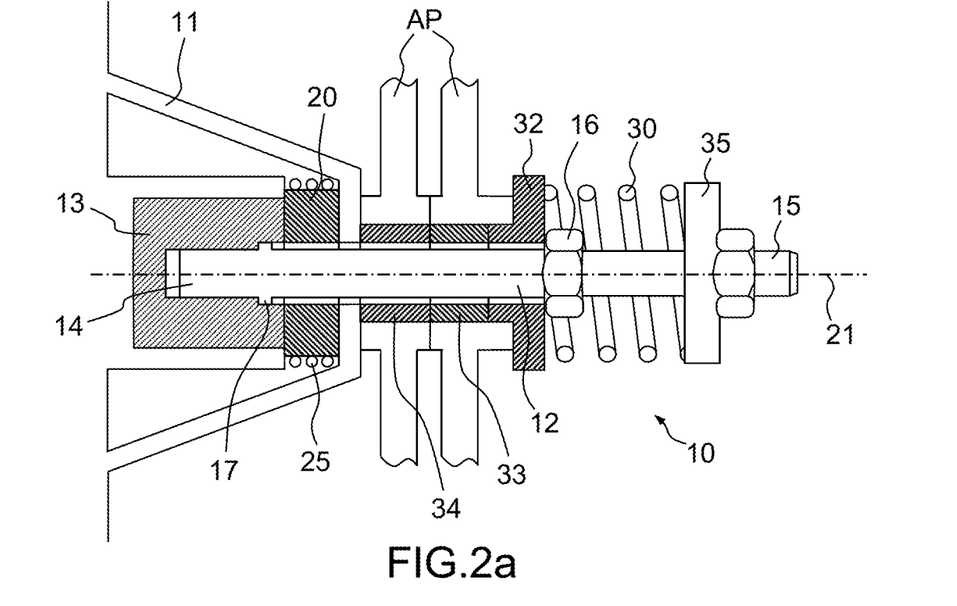
FIG. 2a represents a variant of the device according to the invention in a configuration in which a tie rod is under tension.
Figure 2B:
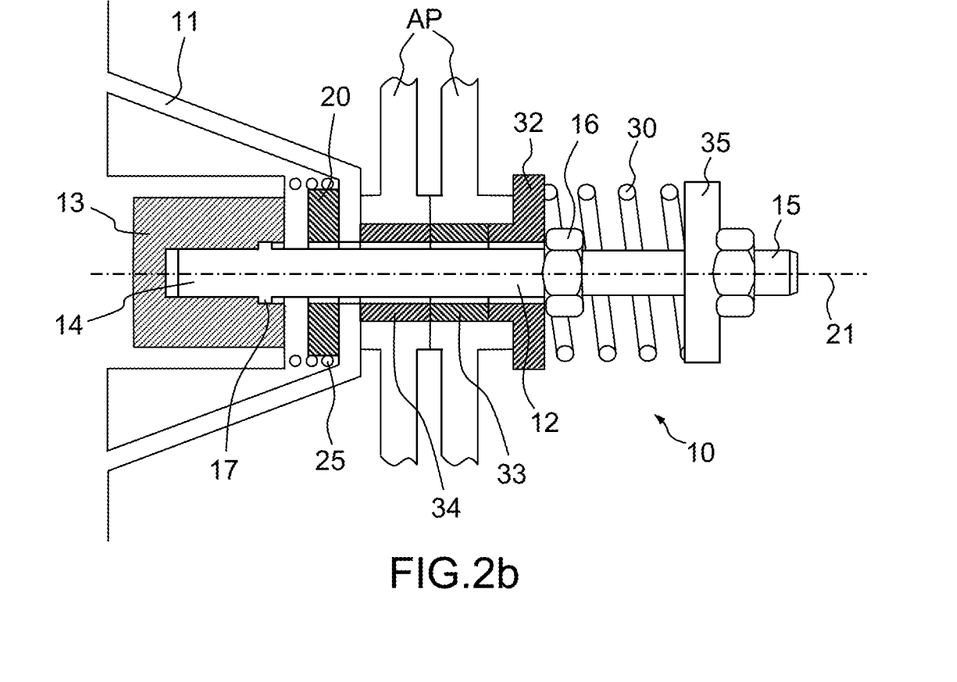
FIG. 2b represents the device from FIG. 2a in a configuration in which the tension in the tie rod is released.

To simplify FIGS. 2a and 2b the appendages AP are not represented. Moreover, the length of the tie rod must be adapted to the number of appendages that it is required to retain in the stowed position.

FIGS. 2a and 2b show a first variant of a device 10 for retaining and releasing the appendages AP. In the various variants described, two appendages AP are represented. It is clearly understood that the invention can be used whatever the number of appendages AP. The device 10 includes a base 11 formed by a tripod P, for example, a tie rod 12 for retaining the appendages AP in the stowed position, and a mechanism 13 for releasing the tie rod 12. The mechanism 13 is fastened to the base 11. The tie rod 12 extends between two ends 14 and 15. In the FIG. 2a configuration the appendages AP are held against one another. This configuration is notably used when the panels of a satellite are folded against the body of the satellite. This configuration is used to launch the satellite with the latter stowed in the nose cap of a launch vehicle and is commonly referred to as the stowage configuration. In this configuration the end 14 is fastened to the base 11 by the mechanism 13 and there is an end piece 16 forming an abutment against which the appendages AP bear at the end 15, for example. The position of the end piece 16 on the end 15 may be fixed. The end piece 16 may be a simple shoulder forming an integral part of the tie rod 12. Alternatively, the position of the end piece 16 may be adjustable along the tie rod 16. To carry out this adjustment, the end piece may be a nut 16 screwed onto the tie rod 12. The tie rod 12 passes through the appendages AP which are clamped between the base 11 and the nut 16. Using an adjustable end piece 16, notably such as a nut, makes it possible to adjust the force clamping the appendages AP. This force is notably calibrated as a function of the inertia of the appendages AP and the vibrations to which the satellite may be subjected during launch.

The mechanism 13 for releasing the tie rod 12 includes a clamp intended to hold the end 14 of the tie rod 12 in the stowage configuration. The mechanism 13 may retain the tie rod 12 by exerting a radial clamping force on the tie rod 12. In other words, the tie rod 12 is retained by adhesion. Alternatively, the mechanism 13 may retain the tie rod 12 in the manner of an obstacle, for example by bearing against a flange 17 of the tie rod 12. When it is required to deploy the appendages AP, the clamp is operated to release the end 14 of the tie rod 12.

The clamp may be operated by a conventional mechanical device, for example using a cam driven by a motor. For faster deployment it is possible to open the clamp by means of a pyrotechnic device.

When a satellite is launched, it may be subjected to high levels of vibration. It is therefore important to ensure the mechanical retention of the appendages AP bearing against the body S and more precisely against the base 11. To provide this retention, even in the presence of vibration, the tie rod 12 is prestressed. To be more precise, the tie rod 12 is maintained in tension between its two ends 14 and 15. As stated above, this prestressing may be adjusted by means of the nut 16. This adjustment makes it possible to ignore the tolerances of the various mechanical parts clamped between the base 11 and the nut 16 and the tolerances of the tie rod itself.

According to the invention, to limit the shocks on opening the clamp, the device 10 includes a component 20 making it possible on command to reduce or to eliminate the tension in the tie rod 12. The component 20 is separate from the tie rod 12, which makes it possible to choose more freely the material of the tie rod 12 as a function of the mechanical strength necessary to maintain the appendages AP under tension, even in the presence of high levels of vibration. The tie rod 12 is made of steel, for example. Also, the component 20 is separate from the mechanism 13.

The component 20 takes the form of a washer through which the tie rod 12 passes, for example. The component 20 has a shape coaxial with the tie rod 12. The coaxial washer shape makes it possible to balance axially the forces exerted by the washer on the base 11 and on the mechanism 13 and to prevent radial forces. Other shapes are of course possible for the component 20. The washer is a mechanical part distinct from the tie rod 12. The washer is configured to slide along the tie rod 12 when assembling the device 10. The tie rod 12 extends along an axis 21 which in the stowed configuration is perpendicular to the plane of the appendages AP folded against one another. The tie rod 12 has a characteristic dimension perpendicularly to its axis 21 between its two ends 14 and 15. At its simplest, the tie rod 12 is for example a rod of circular section. The diameter of that section forms the characteristic dimension of the tie rod 12 perpendicularly to its axis 21. It is clearly understood that other section shapes are possible in the context of the invention. The component 20 has a hole in it with a characteristic dimension greater than the characteristic dimension of the tie rod 12. The characteristic dimension of the hole in the component 20 is defined so as to allow the component 20 to slide along the tie rod 12 when assembling the device 10.

An actuator of the component 20 makes it possible to modify another characteristic dimension of the component 20. In the example represented, that other characteristic dimension is the thickness of the washer measured along the axis 21 of the tie rod 12.

The characteristic dimension of the component 20 along the axis 21 may evolve between two values. For a first of the two values, the component 20 tensions the tie rod 12 and for a second of the two values the tension in the tie rod 12 is reduced or eliminated. In order to prevent completely the occurrence of shocks on releasing the tie rod 12, it is advantageous to define the component 20 so as to eliminate the tension in the tie rod 12. In physical terms, to be certain of achieving complete elimination of the tension, it is necessary to provide a positive functional clearance after the component 20 is operated. However, this clearance may compromise the deployment of the appendages AP. Alternatively, after the component 20 is operated, a low tension may be maintained in the tie rod 20 in order to ensure contact between the appendages AP.

In the example represented, the component 20 shrinks to release the tension in the tie rod 12 between its FIG. 2*a* configuration and that of FIG. 2*b*. It is equally possible to design an opposite arrangement in which the component 20 expands to release the tension in the tie rod 12.

The dimensional variation of the component 20 along the axis 21 may be provided by means of a mechanical device where two opposite faces of the component 20 are moved, for example by means of motorized cams. More simply, the component may include a material of particular and controlled thermal expansion. The dimensional variation of the component 20 is provided by an element 25 for feeding thermal energy to the component or extracting it therefrom. The element 25 may simply be a heater formed of an electrical element surrounding the component 20. In fact, on board a satellite, it is possible to use electrical energy stored in batteries. The appendages commonly include solar panels for charging the batteries afterwards, following deployment of the appendages AP. The component 20 and the element 25 for producing the dimensional variation are independent of the mechanism 13. This independence makes it possible to choose more freely the embodiments of the component 20 and the element 25.

The material of the component 20 of particular thermal expansion may be a conventional material with a high coefficient of thermal expansion. Among metal alloys, it is possible to use a zinc alloy known for its high coefficient of thermal expansion. Some plastic materials based on polypropylene or polyamide have higher coefficients of thermal expansion but are also subject to creep that may reduce the tension in the tie rod 12 if the stowed configuration is maintained for a long time. The dimensions of the component 20 and notably its thickness along the axis 21 are defined as a function of the coefficient of thermal expansion to achieve the required dimensional variation as a function of the temperatures that the component 20 may reach when the heater 25 is activated or not.

In order to reduce the dimensions of the component 20 its material is advantageously a shape memory material. An alloy of titanium and nickel may be chosen, for example. With this type of material it is possible to achieve a high dimensional amplitude for a small thickness at ambient temperature. This high amplitude is obtained by modification of the metallographic structure of the alloy. The change between two structures often termed martensitic at low temperature and austenitic at high temperature makes it possible to obtain a large dimensional variation. FIG. 2a represents the component 20 at ambient temperature and FIG. 2b at a temperature higher than the transition temperature between the metallographic structures, for example of the order of 100° C. if the material has a transition temperature of the order of 85° C. FIG. 2b is a diagrammatic representation and in practice, when the component 20 shrinks, the mechanism 13 remains in contact with the component 20, which makes it possible to reduce the tension in the tie rod 12.

The device includes a spring 30 for moving the tie rod 12 away from the base 11 with a movement in translation along the axis 21. The spring 30 is independent of the tension in the tie rod 12 produced by the component 20 in its FIG. 2a configuration. It is therefore possible to stretch the tie rod 12 so as to ensure that the appendages AP remain in contact with the base 11 during launching of the satellite even if the latter is subjected to high levels of vibration and independently of this to produce a particular force assisting the tie rod 12 to disengage from the appendages during their deployment when the satellite has reached its mission station.

To be more precise, at the end 15 of the tie rod 12, the nut 16, cooperating with a thread of the tie 12, makes it possible to maintain under pressure the appendages AP and one or more spacers 32, 33, 34 between the nut 16 and the base 11. It is even possible to dispense with spacers and even the nut 16 by disposing the spring 30 between the end 15 of the tie rod 12 and the base 11.

Tightening the nut 16 makes it possible to adjust the tension in the tie rod 12, which tension will subsequently be released by the component 20. A second nut 35 cooperating with the same thread of the tie rod 12 (or possibly a separate thread) retains the spring 30 between the spacer 32 and the nut 35. After the tension in the tie rod 12 is released by means of the component 20, the spring 30 pushes on the spacer 32 of the nut 16, thereby allowing the tie rod 12 to disengage.

Figure 3:
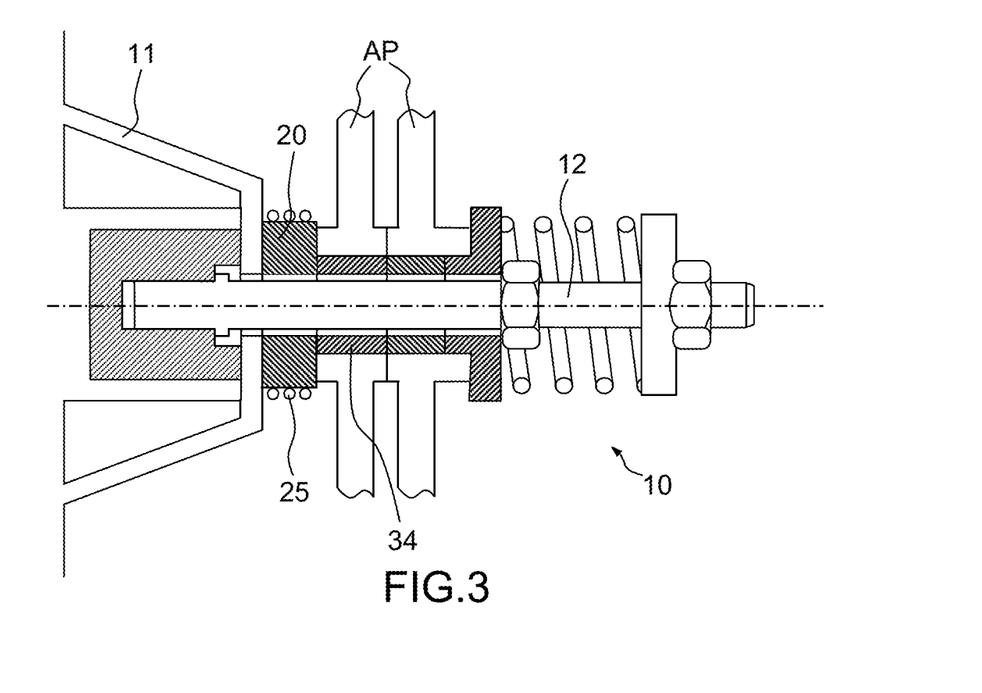
FIGS. 3, 4 and 5 represent other variants of devices according to the invention.

FIG. 3 represents a variant of the device 10 in which the component 20 is disposed between the base and one of the appendages AP.

Figure 4:
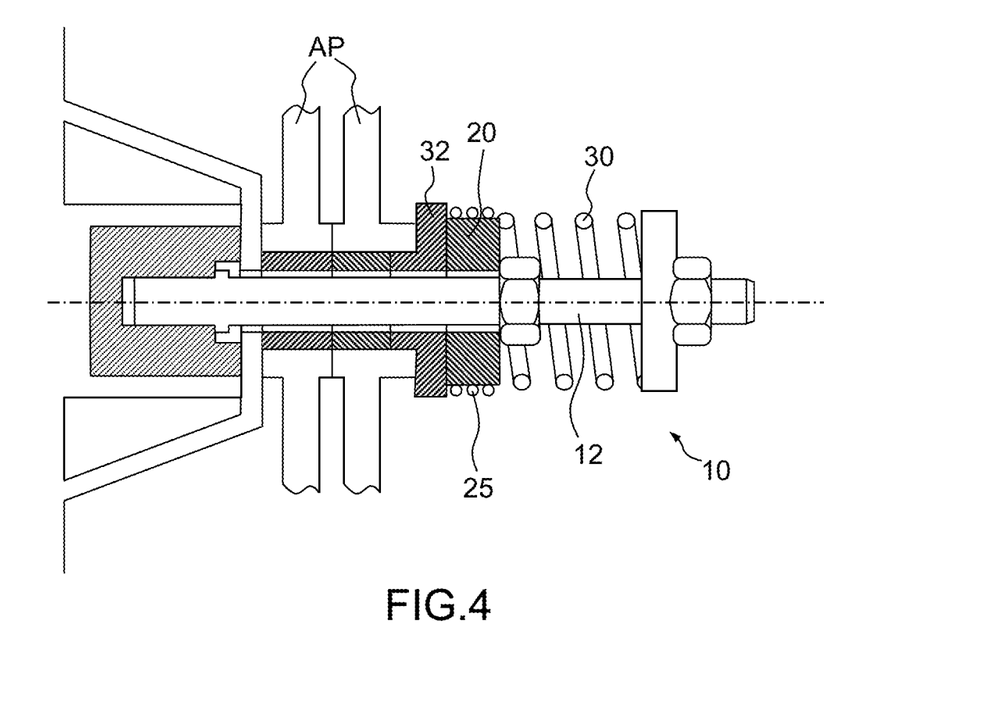

FIG. 4 represents another variant of the device 10 in which the component 20 is disposed between an appendage AP and the end piece formed by the nut 16. It is possible, but not mandatory, to dispose the spacer 38 between the nut 16 and the appendage AP.

Figure 5:
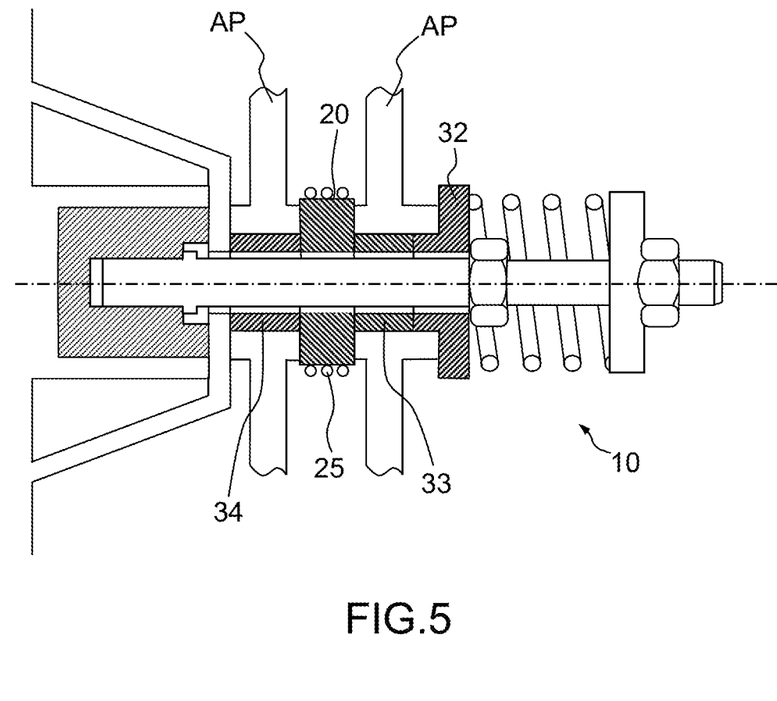

FIG. 5 represents a further variant of the device 10 in which the component 20 is disposed between two appendages AP.

More generally, the component 20 may be disposed between two parts maintained under pressure by the tie rod 12. The position of the component 20 may be chosen as a function of the ease of access to the actuator 25. The independence of the component 20 and its actuator 25 relative to the mechanism 13 for releasing the tie rod 12 facilitates this choice.

The invention claimed is:

1. A device for retaining and releasing appendages, the device comprising:
   a fixed base,
   a tie rod extending along an axis between two ends,
   a mechanism fastened to the base and temporarily retaining a first end of the tie rod, the mechanism including a first actuator configured to release the tie rod from the base,
   an end piece fastened to a second end of the tie rod,
   at least one appendage temporarily retained between the base and the end piece,
   a component disposed between the mechanism and the end piece, the component including a material of particular and controlled thermal expansion and an element configured to feed or extract thermal energy to the component and configured to modify a characteristic dimension of the component along the axis between two values, the component producing a first tension in the tie rod for a first of the two values and a second tension in the tie rod for a second of the two values, the second tension being less than the first tension, wherein
   the component, including the element, is independent of the mechanism, including the first actuator, such that the first actuator and the element are configured to actuate independently from one and other.

2. The device according to claim 1, wherein the component takes the form of a washer configured to slide along the tie rod during assembly of the device.

3. The device according to claim 1, wherein the tie rod has a characteristic dimension perpendicularly to its axis between its two ends and wherein the component has a hole in it with a characteristic dimension greater than the characteristic dimension of the tie rod so as to be able to slide along the tie rod during assembly of the device.

4. The device according to claim 1, wherein the component is disposed between the mechanism and the base.

5. The device according to claim 1, wherein the component is disposed between the base and the at least one appendage.

6. The device according to claim 1, wherein the component is disposed between the at least one appendage and the end piece.

7. The device according to claim 1, comprising at least two appendages and wherein the component is disposed between two appendages.

8. The device according to claim 1, wherein the material is a shape memory material.

9. The device according to claim 1, wherein the element is a heater for raising the temperature of the material of the component.

10. The device according to claim 1, wherein the tension in the tie rod is zero for the second of the two characteristic dimension values of the component along the axis.

11. The device according to claim 1, further comprising a spring disposed between the second end of the tie rod and the at least one appendage, the spring being configured to extract the first end of the tie rod from the mechanism after the mechanism releases the first end of the tie rod.

12. The device according to claim 1, wherein the mechanism including the first actuator includes a clamp intended to hold an end of the tie rod in a stowage configuration.

* * * * *